(12) United States Patent
Anderson et al.

(10) Patent No.: US 7,783,652 B2
(45) Date of Patent: Aug. 24, 2010

(54) KEEPING OFFENSIVE CONTENT OUT OF DEFAULT VIEW ON A WEBSITE

(75) Inventors: Stephen N. Anderson, Redmond, WA (US); Sabrina M. Kikkert, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/400,321

(22) Filed: Apr. 7, 2006

(65) Prior Publication Data

US 2007/0239684 A1 Oct. 11, 2007

(51) Int. Cl.
G06F 7/00 (2006.01)
G06F 17/30 (2006.01)
G06F 15/16 (2006.01)
G06F 15/173 (2006.01)

(52) U.S. Cl. .................. 707/757; 709/203; 709/218; 709/225

(58) Field of Classification Search .............. 707/9, 707/513, 5, 10; 709/203, 218, 225; 713/201
See application file for complete search history.

(56) References Cited

U.S. PATENT DOCUMENTS

| | | | |
|---|---|---|---|
| 5,978,842 A | 11/1999 | Noble | 709/218 |
| 6,058,422 A * | 5/2000 | Ayanoglu et al. | 709/226 |
| 6,065,055 A | 5/2000 | Hughes | 709/229 |
| 6,154,844 A | 11/2000 | Touboul | 713/201 |
| 6,493,733 B1 | 12/2002 | Pollack | 707/513 |
| 6,594,664 B1 * | 7/2003 | Estrada et al. | 707/10 |
| 2001/0037359 A1 * | 11/2001 | Mockett et al. | 709/203 |
| 2002/0002602 A1 * | 1/2002 | Vange et al. | 709/219 |
| 2002/0040364 A1 * | 4/2002 | Saito et al. | 707/9 |
| 2002/0165986 A1 | 11/2002 | Tarnoff | 707/10 |
| 2002/0178154 A1 * | 11/2002 | Shirota | 707/3 |
| 2003/0035075 A1 * | 2/2003 | Butler et al. | 348/734 |
| 2003/0182277 A1 * | 9/2003 | Kurakake | 707/3 |
| 2003/0191754 A1 * | 10/2003 | Dey et al. | 707/3 |
| 2004/0006621 A1 | 1/2004 | Beilinson | 709/225 |
| 2004/0181462 A1 * | 9/2004 | Bauer et al. | 705/26 |
| 2004/0216084 A1 | 10/2004 | Brown | |
| 2005/0131868 A1 | 6/2005 | Lin | 707/5 |

FOREIGN PATENT DOCUMENTS

WO WO2004063911 7/2004

OTHER PUBLICATIONS

Robert Cooley; The Web Site Information Filter System; 1999; pp. 1-7.*

(Continued)

*Primary Examiner*—Neveen Abel Jalil
*Assistant Examiner*—Jermaine Mincey
(74) *Attorney, Agent, or Firm*—Merchant & Gould P.C.

(57) ABSTRACT

A content management system determines which user submitted content is to be included in a default experience of a mixed content website. Users submitting content are assigned trust levels based on their history of content submittal and other users' experience with the submitted content. Once a user reaches a predetermined trust level, their content may be included in the default experience without further vetting. An additional complaint review mechanism may be included for filtering unacceptable content and adjusting a submitting user's trust level.

10 Claims, 5 Drawing Sheets

OTHER PUBLICATIONS

Pistoia, Marco; Tiong, Poh Yee, "IBM WebSphere Performance Pack: Caching and Filtering With IBM Web Traffic Express," International Technical Support Organization, http://cs.nju.edu.cn/cs2/jiaowang/ibmtech/ibm%20course/WebSphere/sg245859.pdf.

Akdeniz, Yaman, "Governing Pornography & Child Pornography on the Internet: The UK Approach," CyberLaw Research Unit, Faculty of Law, University of Leeds, United Kingdom, http://www.cyber-rights.org/documents/us_article.pdf.

"Government-Imposed Filtering Schemes Violate The Right to Free Expression," http://www.comminit.com/africa/strategicthinking/stnafrica/sld-2742.html.

* cited by examiner

KEEPING OFFENSIVE CONTENT OUT OF DEFAULT VIEW ON A WEBSITE

BACKGROUND

On-line information proliferates constantly attracting people from all walks of life. While the Internet offers access to a wealth of educational, entertainment, and similar materials of interest to a wide variety of people, it is also replete with information perceived as offensive by some people. Many websites include content that is a mixture of content created by the website management team organization and by some of the users. When a system that accepts content from users and mixes that content with "managed" content (i.e. content authored or reviewed by the hosting organization running the site or service), appropriateness or offensiveness of the user provided content may become a difficult problem to address.

Requiring that all content submitted by users be reviewed by the hosting organization places a limit on the amount of content that can make it to the site, since it depends upon the website organization's internal resources available to review that material. This may be further compounded when multiple languages are taken into consideration. Furthermore, a malicious user could post hundreds or thousands of instances of objectionable content all requiring to be individually reviewed or filtered.

On the other hand, setting the bar too high may unnecessarily limit user provided content defeating the purpose of having a mixed content website. Typically in these systems, a majority of content comes from a vast minority of contributors who are active participants on the website. Hence, in order to accept a lot of content, it may behoove site architects to design a system in such a way that content from these high-value contributors can easily find its way into the default experience.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to managing web content by determining which user submitted content is to be included in a default experience for those viewing the web content. According to some embodiments, users may be assigned trust levels based on their history of content submittal and other users' experience with that submitted content. Once a user reaches a predetermined trust level, their content may be included in the default viewing experience without further vetting. According to other embodiments, an additional complaint and complaint review mechanism may be included for allowing consumers of content to alert website managers that content is inappropriate.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a virtual quarantine may be provided by means of a "quality" setting on a website, that allows searching, browsing, and downloading of both managed content and user submitted content. User submitted content is allowed to be presented at a preset default quality level based on a trust level assigned to the submitting user.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, the term "user" refers to a person or computer application that accesses a website for the purpose of viewing website content, downloading content from the website, submitting content to the website, and similar actions. The term "author" specifically refers to the submitter of content, while the term "consumer" refers to the reader of that content. The term "content" refers to any data included on the website that can be viewed, downloaded, submitted, etc. Content may include, but is not limited to, text-based data, audio, video, still image, binary and proprietary files, a mixture of any of these, and any other form of data known in the art. The terms "default experience" and "default viewing", which are used interchangeably throughout the text, refer to a default configuration of a website that is presented to users with a predetermined authorization level. This is often the experience when a user visits a website for the first time. A more detailed explanation of the default experience is provided below in conjunction with FIG. 2.

Figure 1:
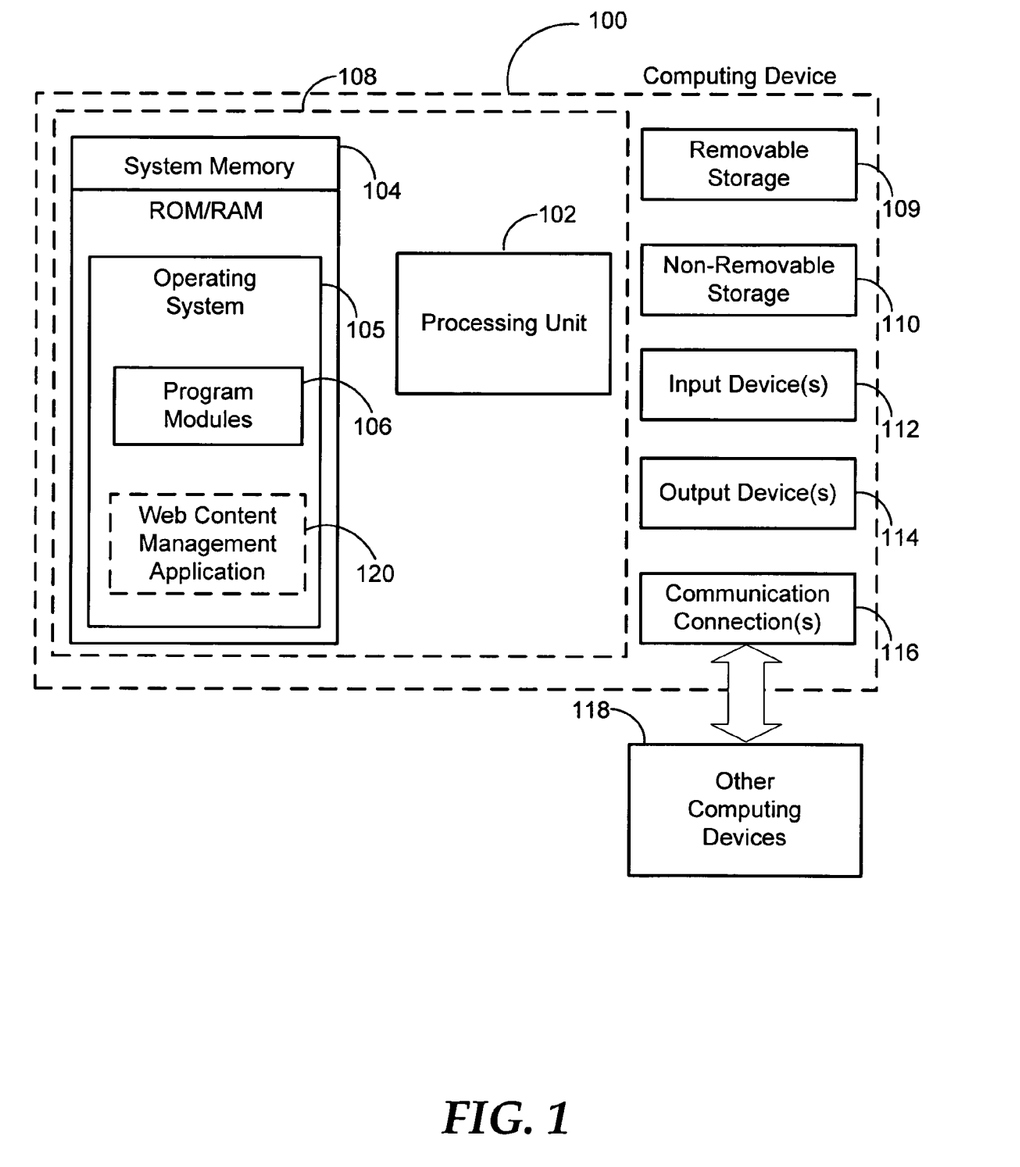
FIG. 1 is a block diagram of an example computing operating environment.

Referring now to the drawings, aspects and an example operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106 and web content management application 120. Program modules 106 and web content management application 120 may be executed within operating system 105 or in another operating system. Furthermore, program modules 106 and web content management application 120 may be distributed programs that are executed in coordination with other computing devices.

According to embodiments, the web content management application 120 may comprise many types of programs configured to administer content on a website. Actions associated with the management of web content may include, but are not limited to, acceptance of submitted content from website administrator, users, and the like; workflow management operations; deployment operations; resource management; and similar operations. Web content management application 120 may also comprise a multiple-functionality software application for providing many other types of functionalities. Such a multiple-functionality application may include a number of program modules. The basic integrated configuration is illustrated in FIG. 1 by those components within dashed line 108.

According to some embodiments, a web content management system may have several aspects. First, users may be assigned trust levels based on their history of content submittal and other users' experience with that submitted content. Content from these trusted users is then considered trusted, until and unless the author violates the trust. Second, a method is provided for how users may achieve the trust level. Once a user reaches a predetermined trust level, their content may be included in the default viewing experience without further vetting.

Third, a method by which consumers of content (those viewing or accessing the content) can set a "quality level." By default, this quality level may be set to show trusted content only. Since most people do not change the website's default settings, the net effect may be that most people see only trusted content. Moreover, an additional complaint and complaint review mechanism may be included for allowing consumers of content to alert website managers that content is inappropriate. If true, the website manager can reset the trust level of the author of inappropriate content (as well as removing the content itself).

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
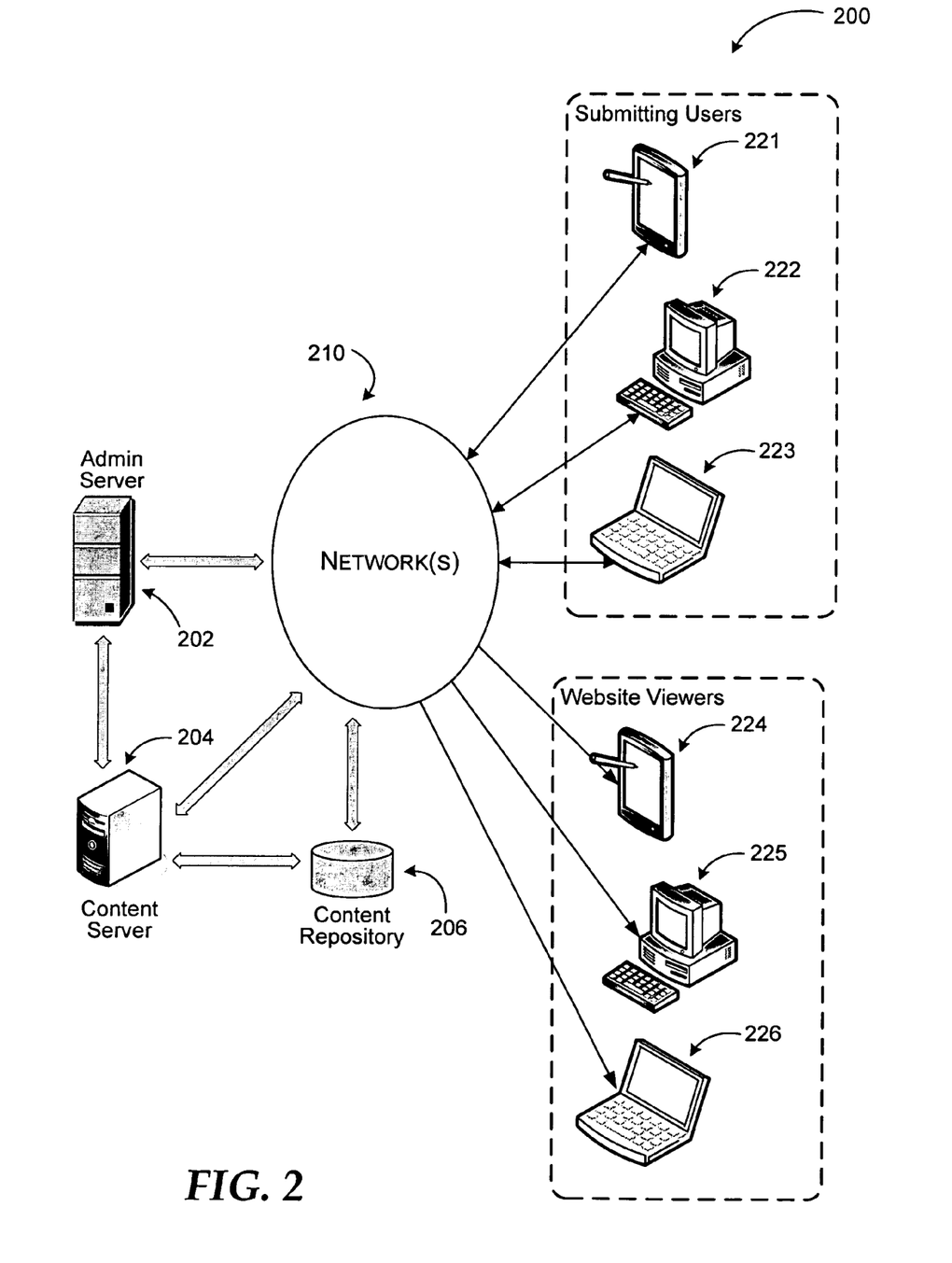
FIG. 2 illustrates a networked system where example embodiments may be implemented.

Referring to FIG. 2, a networked system is illustrated where example embodiments may be implemented. System 200 includes admin server 202, content server 204, content repository 206, submitting users 221-223, and website viewers 224-226. Submitting users 221-223 and website viewers 224-226 may access a website administered by admin server 202 from clients through network(s) 210. The term "client" may refer to a client application or a client device employed by a user to interact with website. Admin server 202 may be one or more programs or a server machine executing programs associated with the admin server tasks. As described above, a program such as a web content management application may be executed in admin server 202 or by any one of the clients and shared in a distributed manner.

Content server 204 may manage content repository 206, which stores content used by the website. Portions of the content may be "managed" content prepared and/or submitted by the website managing organization, and other portions may be user submitted content. Users of the website have been categorized in two groups, submitting users 221-223 and website viewers 224-226, to underline the distinction between users who submit content to the website and users who only access the website to view or download material. As described further below, embodiments are directed to managing content submitted by the users such that offensive material is minimized on the website.

Admin server 202, content server 204, submitting users 221-223, and website viewers 224-226 may communicate over one or more networks. The network(s) 210 may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

In a typical implementation, a user may interact with a website that includes content for viewing and/or downloading. The website may include content that is solely prepared by the managing organization, content that is submitted by one or more users, and content that is a mixture of the two. While it is relatively easy for the website managers to control content prepared by the managing organization, ensuring non-offensiveness of user submitted content may present a challenge. An example of such a website is the Office Templates website managed by MICROSOFT CORPORATION of REDMOND, Wash. The site provides a forum for user of the OFFICE® programs to interact, discuss features and issues, and exchange material such as templates. Allowing the users to submit their own templates enables exchange of a wealth of material enhancing user experience with the OFFICE® programs.

While most templates shared through the website are subject specific and technical in nature, some users may submit templates that may be found offensive by others. The difficulty in filtering offensive material lies not only in content evaluation of numerous templates that are submitted each day, but also in setting a bar for acceptance level. Content found offensive by some users may be quite acceptable and useful to others. To avoid over-filtering, the website may be set up at different "quality" levels. For each quality level, the amount and filtering of available material may be set differently. For example, a high quality level may present only managed content to the website viewers. A medium quality level may present a mixture of managed content and trusted user content. Finally, a low quality setting may allow access to all material at the website. Other gradations may also be implemented using the principles described herein. A default experience, which users encounter when they first visit the site, may be set to the medium quality level forcing users who desire access to all material to voluntarily change their quality setting.

In managing a website as described above, the next challenge is determining the trusted user content. Different filtering mechanisms may be applied to user submitted content for determining a trust level associated with the submitted content. As described below, some embodiments are directed to methods of evaluating and assigning user trust levels for submitted content.

Figure 3:
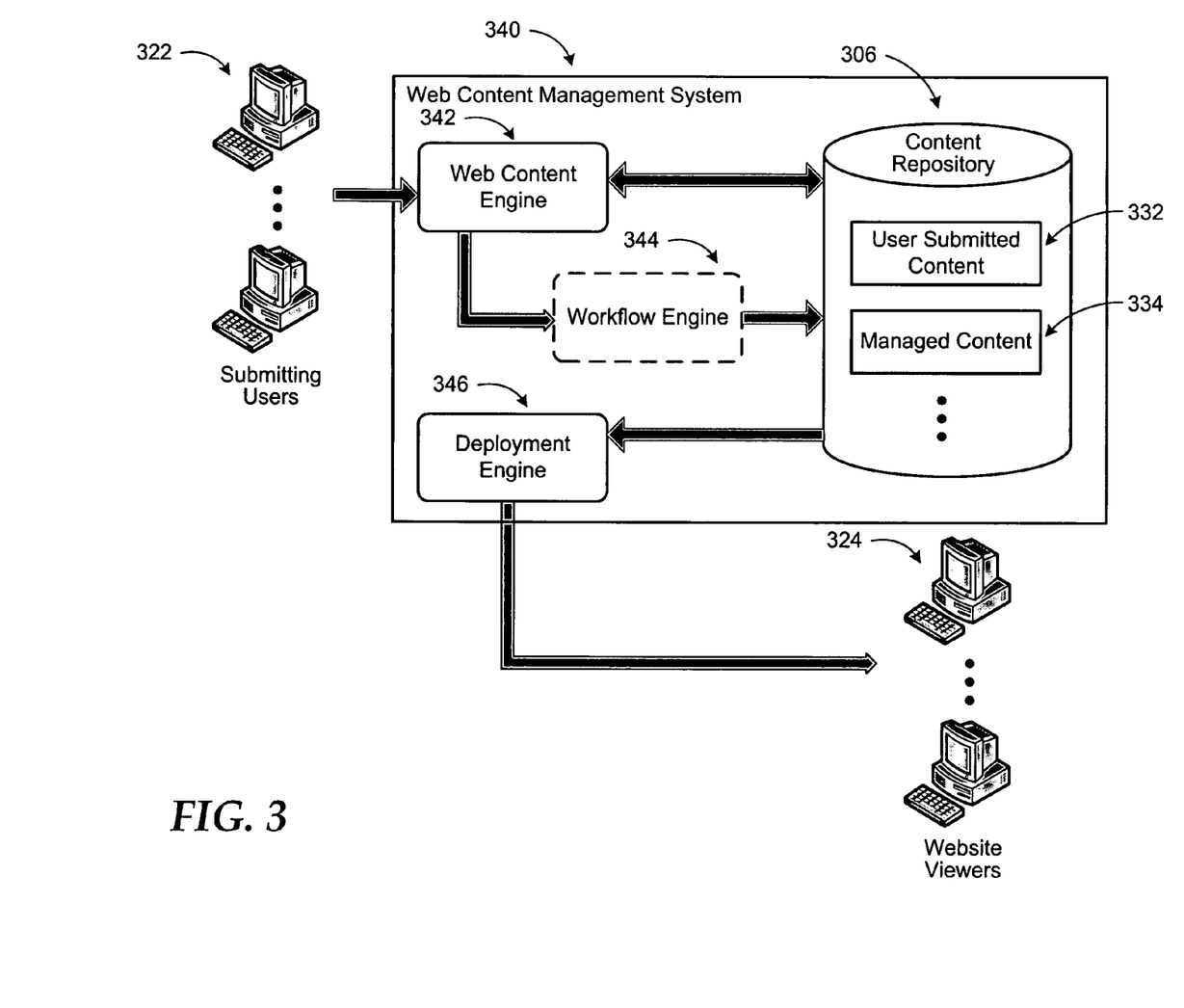
FIG. 3 illustrates an example web content management system according to embodiments.

Now referring to FIG. 3, an example web content management system and its interactions are shown. Web content management system 340 may include web content engine 342, deployment engine 346, and an optional workflow engine 344. Web content management system 340 may further include content repository 306 that stores content associated with the website(s) managed by the web content management system 340. The system may be operated in one server or in a distributed manner in multiple computing devices and/or applications.

Embodiments described here assume a system for accepting content submissions from a general user base at large, including a means of identifying a person based on a user-supplied username and password. The identifiers, based on the username and/or password of the persons submitting content, are tracked with the content, so that the content can be associated with a person.

Web content engine 342 is configured to receive content from submitting users 322 and manage website content, mixing user submitted content 332 with managed content 334. As described above user submitted content 332 and managed content 334 may be combined based on a quality level setting of the website. An optional workflow engine 344 may operate in cooperation with the web content engine 342 and manage workflow operations associated with the website(s) and their content.

Deployment engine 346 may manage deployment of content from content repository 306 for rendering on website viewers' machines and applications. Embodiments are not limited to user submitted content and managed content. Other types of content may also be included in the website using the principles described herein. Furthermore, a web content management system according to embodiments may include additional components without departing from a scope and spirit of the invention.

As mentioned above, a website may be set up to present a mixture of user submitted content and managed content depending on a quality setting. To determine which user submitted content is to be included in a default experience of the website, users may be assigned trust levels according to some embodiments. If a user is a new user on the website, content published by that user may not be shown in a default view when other users are searching or browsing. These users can change a filter setting to see this new content, but do so voluntarily. After a user has submitted content successfully and the system has determined that the submitted content is not objectionable, the user can submit subsequent content straight to the default experience.

According to one embodiment, vetting submitted content for a minimum quality bar may comprise three criteria: (1) the content must be on the website for a certain amount of time, where the amount of time is adjustable; (2) a certain number of users must have downloaded the content, where the number of users may also be adjustable; and (3) less than a predetermined number of complaints must be received for the submitted content, where the website includes a mechanism for people to complain if the content is inappropriate.

If conditions (1) and (2) are met, one can presume that other users have had sufficient opportunity to review the submitted content. The content has resided on the website long enough for someone to complain if they wanted to and if it were inappropriate, someone would have complained. Therefore, condition (3) acts as an additional safety mechanism. Since most consumers of website material do not change their default settings, the effect is that most users see only trusted content, and only those users who have invited untrusted content see it.

Figure 4:
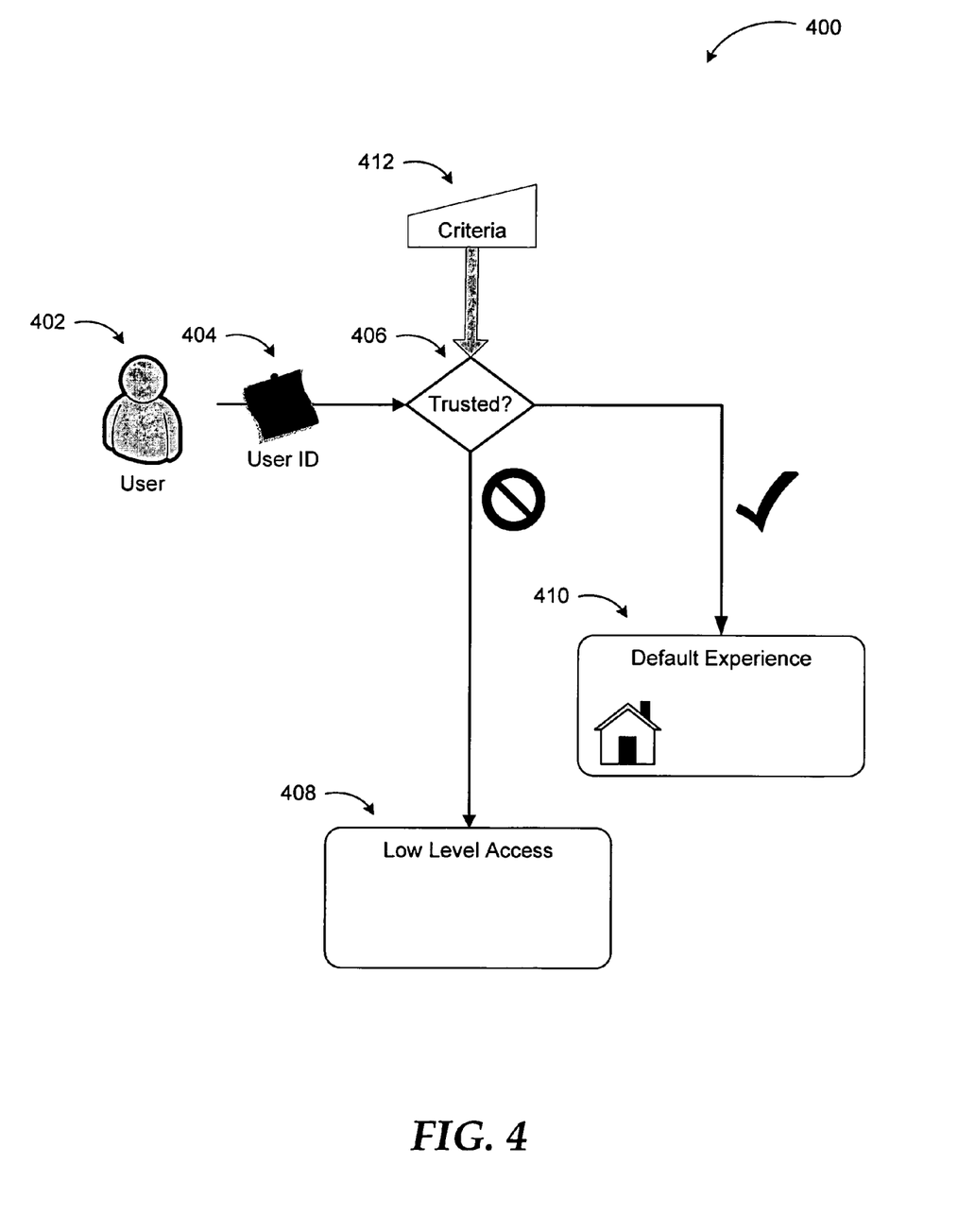
FIG. 4 is a conceptual diagram illustrating deployment of user submitted content based on user trust level according to embodiments.

FIG. 4 is a conceptual diagram illustrating deployment of user submitted content based on user trust level. User 402 represents a user of a website who submits content to be included in the website. To assess the user's trust level and/or assign a trust level (if the user is a new user), the web content management system first needs to determine the user's identification. This may be accomplished in many ways such as the user transmitting a user ID 404, supplying a password, entering personal information, using a cookie, and the like. Once the user identification is determined, the system next determines if the user is a trusted user or not. If the user is a trusted user as described above, the submitted content may be directed to the default experience 410 directly.

A user may not be trusted based on their usage history (e.g. new user) or past demotion of their trust level (e.g. complaints about previously submitted content by the user). If the user is not trusted, submitted content may be directed to low level access setting (408) of the website allowing only those users to search, browse, or download that set their quality filter parameter to the low level voluntarily.

A user's trust status may be determined based on a combination of factors such as those listed above. A counter may determine a number of accesses of the user submitted content, while another counter may determine the duration (e.g. days) of the user submitted content on the website. By allowing one or the other of the two criteria to be met, user content that does not include offensive material but may not be as popular as other content is protected from being filtered out automatically.

On the other hand, the combination of the two criteria also allows protection against malicious users who may solicit other users to access their offensive content and push up the access counter artificially. The duration counter provides time for other users to detect the offensive material and complain about it, so that the material can be removed.

Additional criteria may be employed to enhance and adjust the trust level determination. For example, users with certain credentials (e.g. users that belong to a particular organization) may be started at a higher beginning value for their access or duration counters, or they may be subjected to a lower threshold than other users. In some embodiments, users with preset credentials may be enabled to have a vote count that is weighted more than other users. Moreover, the determination of the trust level may also be based on viewer ratings in addition to access and duration. That way, a user submitted content that appears to be popular with the viewers may be elevated to the default experience faster than regular submitted content. Similarly, submitted content in certain subject areas may be assigned different counter thresholds. For example, the likelihood of offensive content in a mathematical calculation forum is less than that in a political discussion forum. Therefore, content submitted by new users for the mathematical calculation forum may not necessarily be subject to the same scrutiny as the political discussion forum content.

According to other embodiments, new users who obtain trusted status may be subject to further review. If a preset number of valid complaints are received for a trusted user, the trusts level for that user may be reduced to new user to prevent further offensive content from being presented in the default experience.

Figure 5:
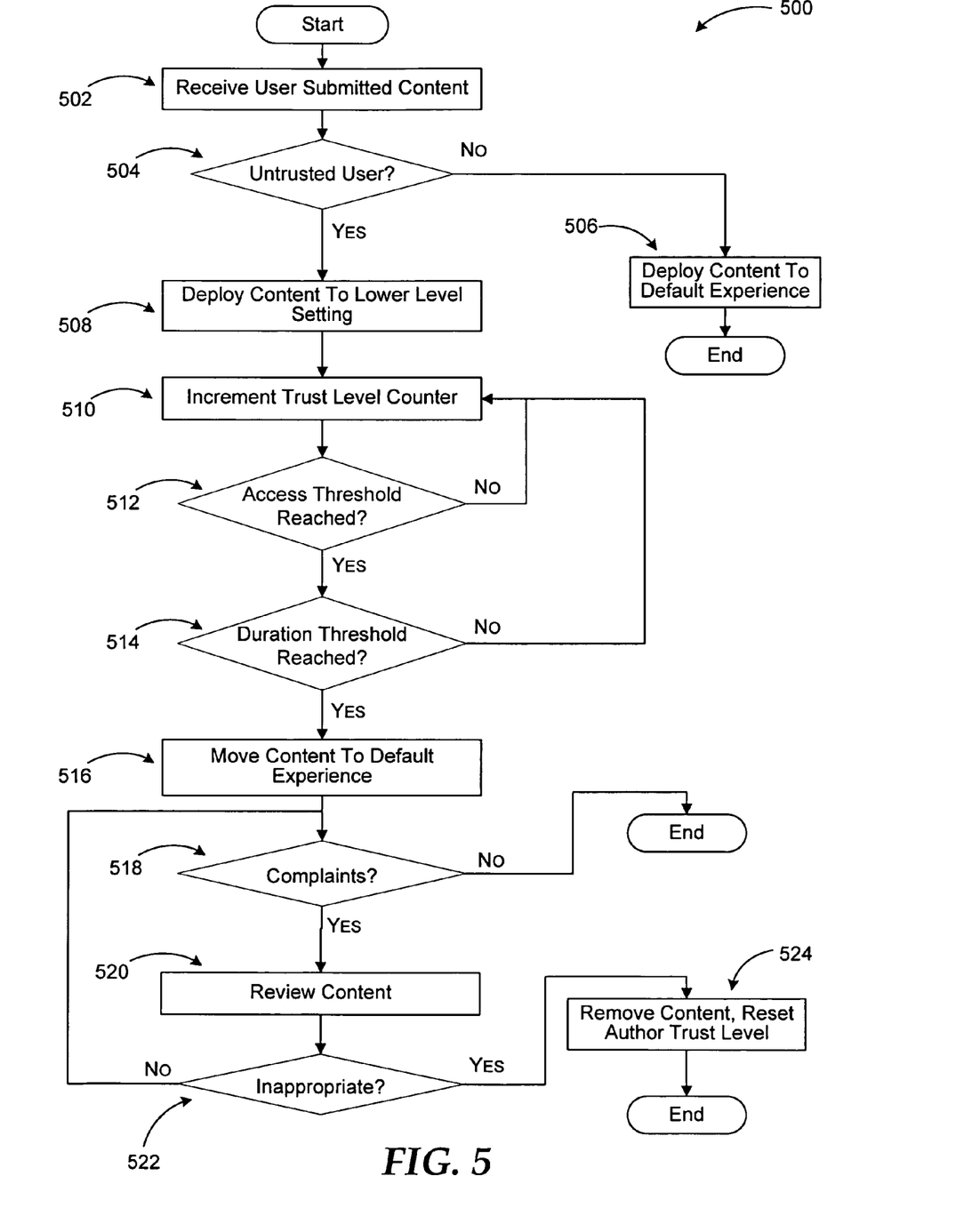
FIG. 5 illustrates a logic flow diagram for a process of keeping offensive content out of a default experience on a website based on user trust level.

FIG. 5 illustrates a logic flow diagram for a process 500 of keeping offensive content out of a default experience on a website based on user trust level. Process 500 may be implemented in a web content management server or client as described in FIG. 2.

Process 500 begins with operation 502, where user submitted content is received. Processing moves from operation 502 to decision operation 504 to determine whether the user submitting the received content is an untrusted user.

If the determination at decision operation 504 is that the user is a trusted user, processing advances to operation 506, where the received content is deployed directly to the default experience of the website. After operation 506, processing moves to a calling process for further actions. If the user is an untrusted user, processing moves to operation 508.

At operation 508, the received content is deployed to a lower level quality setting of the website where it will be accessible only by those users who voluntarily set their quality parameters to the low setting. Processing advances from operation 508 to operation 510.

At operation 510, a trust level counter is incremented. The trust level counter may comprise multiple counters such as a number of accesses counter, a duration on the website counter, user ratings of the content, and the like. For a new user, the trust level counter(s) may begin from a lowest value. According to some embodiments, the beginning value of the trust level counter(s) may be set to a higher value depending on various factors such as the subject area, the user's credentials, and the like. Processing moves from operation 510 to decision operation 512.

At decision operation 512, a determination is made whether an access threshold is reached. As mentioned above, the trust level may be determined based on a number of counters. The access counter incrementing every time a user searches, browses, or downloads the submitting user's content is one component of the trust level determination. A threshold for this counter may be set based on a user credential, a subject area, and the like. If the threshold has not been reached yet, processing returns to operation 510 to increment the counter. If the threshold has been reached, processing moves to decision operation 514.

At decision operation 514, a determination is made whether a duration threshold is reached. The duration threshold is based on how long the user content has been included on the website. The duration counter acts as a second component of the trust level determination. It further protects against malicious users who may solicit others to access the submitted content and artificially push up the access counter since other, independent and hopefully more virtuous users would then have a chance to review the content independently. If the duration threshold has not been reached yet, processing returns to operation 510 for further incrementing of the duration counter. If the threshold has been reached, processing moves to operation 516.

At operation 516 the content is moved to the default experience and the user is designated as a trusted user. Any additional contents from the same user may be deployed to the default experience from this point on. According to other embodiments, the submitting user's trust level may be further monitored based on predetermined criteria such as complaints, number of accesses, and accordingly adjusted. Processing continues unless and until there is a complaint, shown as decision operation 518.

At decision operation 518, a determination is made whether any complaints have been received for the user submitted content. Handling of the complaints may also be based on adjustable policies. In some cases, a threshold for the number of complaints may be set up. In other cases, a single complaint may be sufficient to remove the content from the website. In yet other cases, the nature and/or source of the complaints may also be considered. If complaints have been received, processing advances to operation 520.

At operation 520, the content containing offensive material is reviewed and processing moves to decision operation 522.

At decision operation 522, a determination is made whether the reviewed content is inappropriate. If the content is not found inappropriate, processing returns to decision operation 518 for further monitoring of complaints.

If the content is found to be inappropriate at decision operation 522, processing moves to operation 524, where the content is removed from the website. At operation 524, the removal of content submitted by a user may also result in that user's trust level being reset to a new user level, or even the user being banned from submitting new content. In some embodiments, the modification of the user's trust level may be based on a policy evaluating a number and nature of content removals. After operation 524, processing moves to a calling process for further actions.

The operations included in process 500 are for illustration purposes. Keeping offensive content out of default view on a website may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to be executed at least in part in a computing device for managing website content, comprising:

receiving content from a user to be included on the website, the user submitting the content to the website so that the submitted content can be viewed by other users;

determining a trust level of the user, wherein the user's trust level is assigned based on a group of metrics associated with the user's content submittal history, the group of metrics including a first metric based on a duration of the received content on the website, a second metric based on a number of accesses to the received content by other users on the website, and a third metric based on one of a rating assigned by other users to the received content on the website and a credential associated with the user, the user's trust level being assigned based on a weighted combination of the first, second, and third metrics;

deploying the received content on a default experience of the website, if the user's trust level is sufficient, the default experience of the website including a combination of managed content and trusted user content, the default experience of the website permitting a viewer of the website to search, browse or download the content from the website only when a quality level on the website is set to a medium level, the viewer being different than the user that submitted the content to the website; and deploying the received content on a low level access setting of the website, if the user's trust level is not sufficient, the low level access setting of the website permitting the viewer of the website to search, browse or download all material at the website only when a quality filter parameter on the website is set to a low level, the viewer being different than the user that submitted the content to the website, wherein the content from the website that is to be searched, browsed or downloaded using the medium level is a subset of the material at the website that is to be searched, browsed or downloaded using the low level.

2. The computer-implemented method of claim 1, wherein the website includes a high level access setting with managed content only, a default experience setting with managed content and trusted user content, and a low level access setting with managed content and any user submitted content.

3. The computer-implemented method of claim 1, wherein the managed content is content prepared by an organization managing the website.

4. The computer-implemented method of claim 1, further comprising: determining the user's identity based on one of user provided information and a cookie.

5. The computer-implemented method of claim 1, wherein accessing the received content includes an action from a set of searching, browsing, and downloading the received content.

6. The computer-implemented method of claim 1, further comprising:

receiving another content from the user; and adjusting the user's trust level based on the other received content.

7. The computer-implemented method of claim 6, further comprising reducing the user's trust level if a complaint is received from another user associated with the received content.

8. A system implemented on a computing device for keeping offensive content out of a default experience on a website that includes managed content and content submitted by a user, the system comprising:

a memory;

a processing unit;

a web content engine, on the computing device, configured to:

receive the user submitted content, the content being submitted so that the content can be viewed by other users;

identify an author of the user submitted content;

determine a trust level of the user based on a content submittal history, wherein the content submittal history includes a first criterion based on a duration of the user submitted content's presence on the website, wherein the content submittal history includes a second criterion based on a number of accesses by other users to the user submitted content on the website, and a third criterion based on one of a rating assigned by other users to the received content on the website and a credential associated with the user wherein the user's trust level is designated as sufficient, if the first criterion, the second criterion and the third criterion are met;

designate the user submitted content as trusted user content, if the user's trust level is sufficient;

direct the user submitted content to a medium-level access setting of the website, if the user's trust level is sufficient, the medium-level access setting of the website including a combination of managed content and trusted user content, the medium-level access setting of the website permitting a viewer of the website to search, browse or download the user submitted content from the website only when a quality level on the website is set to a medium level, the viewer being different than the user that submitted the content to the website;

direct the user submitted content to a low-level access setting of the website, if the user's trust level is insufficient, the low level access setting of the website permitting a viewer of the website to search, browse or download all material at the website only when a quality filter parameter on the website is set to a low level, the viewer being different than the user that submitted the content to the website;

remove the user submitted content from the website based on an evaluation of received complaints associated with the user submitted content; and assess the user's trust level periodically based on an evaluation of received complaints associated with the user submitted content;

a deployment engine, on the computing device, configured to deploy the managed content and trusted user content to the default experience of the website; and a content repository, on the computing device, configured to store the managed content and user submitted content, wherein the content from the website that is to be searched, browsed or downloaded using the medium level is a subset of the material at the website that is to be searched, browsed or downloaded using the low level.

9. A computer-readable storage medium having computer executable instructions for keeping offensive content from a default experience of a website, the instructions comprising:

determining a content submitting user's trust level based on a duration and number of accesses of submitted content on the website and based on one of a rating assigned by other users to the received content on the website and a credential associated with the user;

deploying the submitted content to the default experience of the website, if the user's trust level is sufficient, wherein the default experience is presented to viewers with a safe filter setting and includes managed content and trusted user content, the default experience of the website permitting a viewer of the website to search, browse or download the submitted content from the website only when a quality level on the website is set to a medium level, the viewer being different than the user that submitted the content to the website; and deploying the submitted content to a low level setting of the website, if the user's trust level is not sufficient, wherein the low level setting is presented to viewers with a low level filter setting and includes managed content and any user submitted content, the low level setting of the website permitting a viewer of the website to search, browse or download all material at the website only when a quality filter parameter on the website is set to a low level, the viewer being different than the user that submitted the content to the website, wherein the content from the website that is to be searched, browsed or downloaded using the medium level is a subset of the material at the website that is to be searched, browsed or downloaded using the low level.

10. The computer-readable storage medium of claim 9, wherein the instructions further include:

removing the submitted content from the website, if a complaint associated with the submitted content is received; and reducing the user's trust level based on the complaint.

* * * * *